United States Patent [19]

Shibata

[11] 4,064,693
[45] Dec. 27, 1977

[54] SECONDARY AIR SUPPLY SYSTEM FOR INTERNAL COMBUSTION ENGINES

[75] Inventor: Norio Shibata, Susono, Japan

[73] Assignee: Toyota Jidosha Kogyo Kabushiki Kaisha, Toyota, Japan

[21] Appl. No.: 693,126

[22] Filed: June 4, 1976

[30] Foreign Application Priority Data

Feb. 24, 1976 Japan .................................. 51-19186

[51] Int. Cl.² .......................... F02B 75/10; F01N 3/10
[52] U.S. Cl. .......................................... 60/290; 60/293; 137/512.4; 137/522; 137/529; 137/854
[58] Field of Search .................. 60/290, 293; 137/522, 137/529, 512.4, 854

[56] References Cited

U.S. PATENT DOCUMENTS

| 2,551,836 | 5/1951 | Gendreau | 137/529 |
| 2,944,564 | 7/1960 | Pettey | 137/529 |
| 3,751,915 | 8/1973 | Ranft | 60/293 |
| 3,986,353 | 10/1976 | Otsubo | 60/290 |

Primary Examiner—Douglas Hart
Attorney, Agent, or Firm—Birch, Stewart, Kolasch & Birch

[57] ABSTRACT

A non-return air flow system for supplying secondary air into the exhaust system of internal combustion engines by utilizing pulsating flow of exhaust gases in the exhaust system, wherein the critical valve opening pressure for a check valve incorporated in the non-return system is varied in accordance with intake air flow rate of the engine so that supply of secondary air is effected in proportion to air intake of the engine.

8 Claims, 10 Drawing Figures

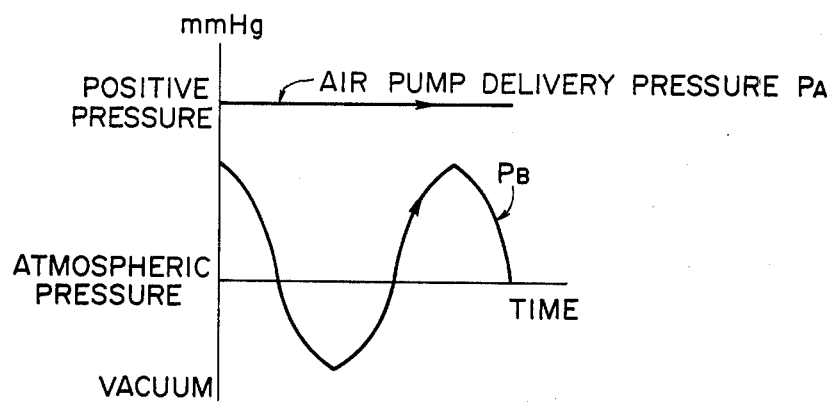

SECONDARY AIR SUPPLY SYSTEM FOR INTERNAL COMBUSTION ENGINES

BACKGROUND OF THE INVENTION

1. Field of the Invention

The present invention relates to a secondary air supply system for supplying secondary air into the exhaust system of internal combustion engines for the purpose of purifying exhaust gases.

2. Description of the Prior Art

It is known to employ a secondary air supply system as a countermeasure for purifying exhaust gases from internal combustion engines so that harmful uncombusted components such as HC and CO contained in the exhaust gases are further combusted in the exhaust system under a supply of secondary air. In order to obtain the highest efficiency of exhaust gas purification and from the point of view of protecting various devices included in the exhaust system from being damaged, it is favorable that the amount of secondary air introduced into the exhaust system is always proportional to the amount of intake air of the engine, i.e., the ratio of secondary air flow to intake air flow is maintained at a constant value. However, such a manner of control for the supply of secondary air is not effected in conventional secondary air supply systems.

On the other hand, the regulations with regard to exhaust gas contamination are becoming very strict and it is required that the efficiency of exhaust gas purification be improved.

SUMMARY OF THE INVENTION

Therefore, it is a primary object of the present invention to provide a secondary air supply system which supplies a properly controlled amount of secondary air into the exhaust system of internal combustion engines in accordance with intake air flow rate of the engine.

The secondary air is generally introduced into the exhaust system of engines by employing an air pump or by utilizing a pulsating flow phenomenon which occurs in the exhaust gas flow system. In both cases, an important factor which determines the amount of secondary air introduced into the exhaust system is the pressure difference between the delivery pressure of the air pump or the atmospheric pressure and the pressure existing in the exhaust system. Since the pressure in the exhaust system varies in accordance with a pattern which resembles a sine curve to a pulsating flow generated in the exhaust system, the aforementioned pressure difference also varies in accordance with a curve similar to a sine curve.

In more detail, therefore, the primary object of the present invention is to provide a secondary air supply system which effectively utilizes the varying performance of said pressure difference for supplying secondary air into the exhaust system of internal combustion engines by an amount which satisfies the condition that the ratio of secondary air flow to intake air flow of the engine is maintained at a predetermined constant value throughout the entire operation of the engine.

According to the present invention, the abovementioned object is accomplished by a secondary air supply system for internal combustion engines comprising a passage means for conducting secondary air into the exhaust system of the engine, and a check valve provided in the midst of said passage means for allowing air to flow only toward said exhaust system, said check valve comprising a valve element which opens the valve when an air pressure difference above a predetermined level exists across the valve and a control means which controls said predetermined level in accordance with the intake air flow rate of the engine in a manner to lower said level as the intake air flow rate increases.

In the abovementioned secondary air supply system, since said predetermined level which is critical for opening the check valve is lowered as the intake air flow rate of the engine increases, the period in a cycle of the pressure fluctuation in the exhaust system during which the check valve is opened becomes longer thereby causing a larger amount of secondary air introduced into the exhaust system of the engine in accordance with the increased intake air flow rate. Therefore, by properly adjusting the delivery pressure of the air pump, through the opening area of the check valve, the critical level of the pressure difference necessary for opening the check valve and other design factors in accordance with the engine displacement and other perforamnces, the rate of secondary air supplied to the exhaust system of the engine can be maintained substantially at a constant ratio with respect to the intake air flow rate of the engine.

According to a particular feature of the present invention, the intake vacuum may be employed as a signal which represents the intake air flow rate of the engine, said signal being applied to said control means for operating same so as to control said predetermined critical level of the air pressure difference. However, the carburetor Venturi vacuum, the average pressure in the exhaust pipe, etc., may also be employed as a signal which represents the intake air flow rate of the engine.

The check valve to be incorporated in the system of the present invention may comprise a valve element resiliently biased toward the valve closing position by a spring means, or the valve may be a reed check valve having a reed valve element flexibly biased toward the valve closing position by the inherent elasticity of the valve element itself.

BRIEF DESCRIPTION OF THE DRAWING

The present invention will become more fully understood from the detailed description given hereinbelow and the accompanying drawings which are given by way of illustration only, and thus are not limitative of the present invention, and wherein:

FIGS. 3 is a graph showing the fluctuating performance of the exhaust gas pressure in the exhaust pipe during one cycle of the engine operation;

FIG. 4 is a graph showing pressure difference between the air pump delivery pressure and the intake pressure of the engine during one cycle period of the engine operation;

FIG. 5 is a graph showing variation in the quantity of secondary air supply in accordance with variation in the opening performance of the check valve;

DESCRIPTION OF THE PREFERRED EMBODIMENT

Figure 1:
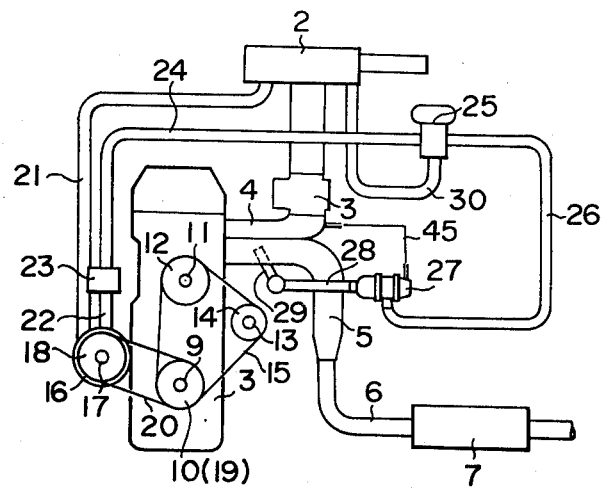
FIG. 1 shows in a schematic fashion an internal combustion engine power plant equipped with the secondary air supply system according to the present invention which is embodied by employing an air pump.

Referring now to FIG. 1, reference numeral 1 generally designates the body of an internal combustion engine which takes in fuel-air mixture through an intake system including an air cleaner 2, a carburetor 3 and an intake manifold 4, while the engine descharges exhaust gases through an exhaust system including an exhaust manifold 5, an exhaust pipe 6 and a catalytic converter 7 provided in the midst of the exhaust pipe. The engine produces output power in a crank shaft 9 which drives a timing gear 10 which drives by way of a timing chain 15 the timing gears 12 and 14 mounted on a cam shaft 11 and a pump shaft 13, respectively, said pump shaft driving an oil pump and a fuel pump not shown in the figure.

Adjacent a side portion of the engine is positioned an air pump 16 to serve as a pressurized secondary air source. The air pump 16 may be of a rotary type such as a vane pump having a pump shaft 17 which is driven by the crank shaft 9 by way of a timing gear 18 mounted on the pump shaft and a timing chain 20 which is engaged around a timing gear 19 mounted on the crank shaft 9 in parallel to the timing gear 10. The air inlet port of the air pump 16 is connected to the air cleaner 2 by way of an air inlet pipe 21 so that the air cleaned by the air cleaner is supplied to the air pump.

The air outlet port of the air pump 16 is connected by way of first secondary air supply pipe 22, relief valve means 23, secondary air supply pipe 24, air switching-over valve 25, third secondary air supply pipe 26, check valve 27 which constitutes an important part of the present invention and fourth secondary air supply pipe 28 to a secondary air injection nozzle 29 so that the compressed air delivered from the air pump 16 is injected into the exhaust manifold from the secondary air injection nozzle 29. The relief valve means 23 may be a relief valve of a conventional structure which is adapted to exhaust excessive secondary air delivered from the air pump 16 as in the case where the check valve 27 is closed. The air switching-over valve 25 is called ASV and operates in a manner that when the temperature of the catalyst in the catalytic converter has risen in high load and speed operating conditions, it connects the second secondary air supply pipe 24 to a secondary air return pipe 30 instead of the third secondary air supply pipe 26 to return the air supplied from the air pump 16 to the air cleaner 2, thereby cutting off supply of secondary air to the exhaust system.

Figure 2:
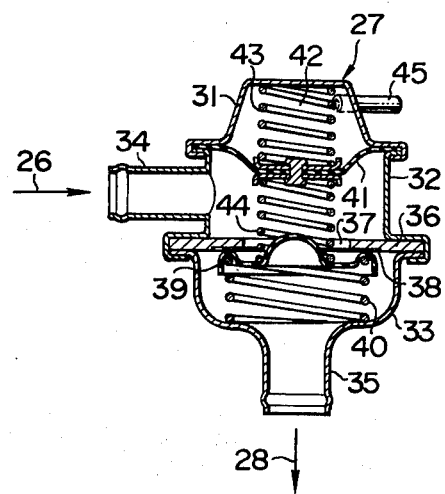
FIG. 2 is a sectional view of an embodiment of the check valve suitable for use in the system shown in FIG. 1.

The check valve 27 which constitutes an important part of the present invention is shown in FIG. 2 in the form of a preferred embodiment. The check valve comprises an upper casing member 31, an intermediate casing member 32 and a lower casing member 33 assembled together to provide the valve casing. The intermediate casing member 32 has a secondary air inlet 34 adapted to be connected with one end of the third secondary air supply pipe 26. The lower casing member 33 has a secondary air outlet 35 adapted to be connected with one end of the fourth secondary air supply pipe 28. The chamber defined between said secondary air inlet and outlet is divided by a separate plate 36 mounted at the joining portion of said intermediate and lower casing members. The separate plate 36 is formed with a through opening 37 around which is defined an annular valve seat 38 facing downward in the figure. A valve member 39 is positioned within the lower casing member 33, said valve member being urged upward in the figure toward the valve seat 38 by a first compression coil spring 40 so as to open or close the opening 37 by cooperation with the valve seat.

A diaphragm 41 is provided to extend between the upper casing member 31 and the intermediate casing member 32, thereby defining a diaphragm chamber 42 above the diaphragm and substantially within the upper casing member 31. The diaphragm 41 is urged downward in the figure by a compression coil spring 43 mounted in the diaphragm chamber 42. Between the diaphragm 41 and the valve member 39 is mounted another compression coil spring 44 which biases the valve member 39 downward in the figure or toward the valve opening mode. The diaphragm chamber 42 is applied with intake vacuum sensed at the intake manifold 4 positioned downstream of the carburetor 3, said intake vacuum being conducted to the diaphragm chamber by way of a conduit means 45.

When the diaphragm chamber 42 is not applied with any substantial intake vacuum (the condition shown in FIG. 2), the second compression coil spring 44 is applied with a preload which is lower by a predetermined value than that applied to the first compression coil spring 40, while the diaphragm restoring compression coil spring 43 has a greater spring constant than the second compression coil spring 44 but is set to be substantially free from any preloading. Consequently, the valve member 39 is applied with a force toward its valve closing position which is the balance between the spring forces of the first and second compression coil springs 40 and 44. This balance determines the critical pressure for opening the valve.

In a check valve of the abovementioned structure, when the intake vacuum introduced into the diaphragm chamber 42 becomes greater, the diaphragm 41 is biased upward in the figure against the action of the compression coil spring 43 thereby elongating the mounting length of the second compression coil spring 44, thus resulting in an attenuation in the force applied by the compression coil spring 44 to the valve member 39. In this case, therefore, the critical valve opening pressure is shifted to a higher level. In other words, since the intake vacuum becomes smaller as the quantity of intake air increases, the critical opening pressure for the valve member 39 is made lower as the intake air flow increases. Consequently, the valve opening duration increases in accordance with an increase in the intake air flow of the engine resulting in a corresponding increase in the secondary air flow passing through the secondary air supply pipes 26 and 28. Thus, when design factors such as spring constants and preloading of the first and second compression coil springs and flow area of the through passage 37 are properly determined, the secondary air will be introduced into the exhaust system by maintaining a substantially constant ratio of the secondary air flow to the intake air flow of the engine.

For further explanation of this operation, reference is made to FIGS. 3-5. FIG. 3 shows variations in the delivery pressure of the air pump 16 and exhaust gas pressure in the exhaust pipe or exhaust manifold during a cycle time of the engine. The air pump delivery pressure is maintained at a constant positive pressure as indicated by $P_A$ while the pressure in the exhaust pipe fluctuates in a manner similar to a sine wave as indicated by $P_B$. Consequently, the pressure difference between the air pump delivery pressure $P_A$ and the exhaust gas pressure $P_B$ in the exhaust pipe which is effective for feeding secondary air into the exhaust system varies in a manner similar to a sine wave as shown in FIG. 4. Therefore, when a relatively small intake vacuum is applied to the diaphragm chamber 42 of the check valve 27 with the critical opening pressure of the valve member 39 being shifted to a relatively low level such as indicated by $P_1$ in FIG. 4, the opening duration of the valve member 39 is relatively long as shown by $T_1$. By contrast, when the intake vacuum applied to the diaphragm chamber 42 becomes greater to provide correspondingly higher critical opening pressures for the valve member 39 such as $P_2$ and $P_3$, the opening duration of the valve member 39 will be reduced as indicated by $T_2$ and $T_3$, resulting in a gradual reduction in the quantity of secondary air injected from the nozzle 29 into the exhaust manifold 5 such as indicated by $Q_1$, $Q_2$ and $Q_3$ in FIG. 5.

Figure 6:
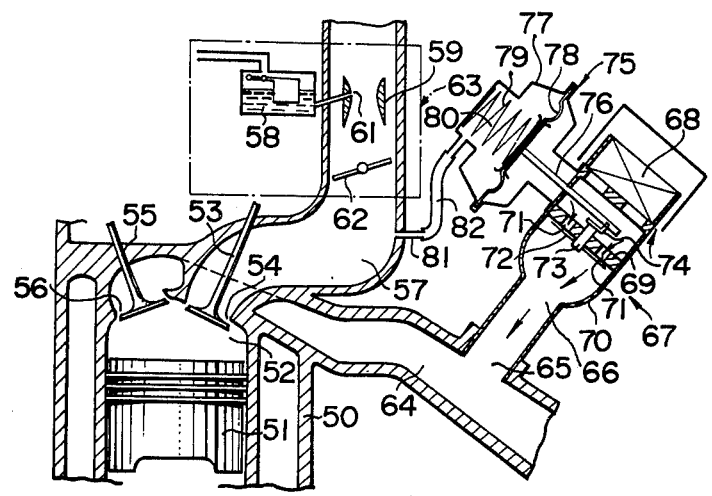
FIG. 6 is a relatively schemmatical sectional view of a portion of an internal combustion engine wherein the secondary air supply system of the present invention is incorporated as a system of utilizing pulsating flow of exhaust gases.

FIG. 6 shows another embodiment of the invention wherein secondary air is introduced into the exhaust system of the engine by utilizing the pulsating performance of exhaust gases in the exhaust pipe which produces periodical vacuum in the exhaust pipe. In the structure shown in FIG. 6, 50 designates the body of an internal combustion engine having a piston 51 adapted to reciprocate in a cylinder formed therein and a combustion chamber 52 defined above the piston. The upper wall portion facing the combustion chamber is formed with an intake port 54 adapted to be opened or closed by an intake poppet valve 53 and an exhaust port 56 adapted to be opened or closed by an exhaust poppet valve 55. The intake port 54 is connected with an intake passage 57 including a carburetor 63 provided in the way thereof. The carburetor may be of a conventional type having a float chamber 58, Venturi portion 59, main nozzle 61 and throttle valve 62 and produces fuel-air mixture to be supplied into the combustion chamber 52 through the intake port 54. The exhaust port 56 is connected with an exhaust passage or exhaust manifold 64 which includes a secondary air supply port 65 adapted to open toward the exhaust gas passage defined by the manifold in the way thereof. The port 65 is opened to the atmosphere through a passage 66 which includes a check valve 67 and an air filter 68.

Figure 7:
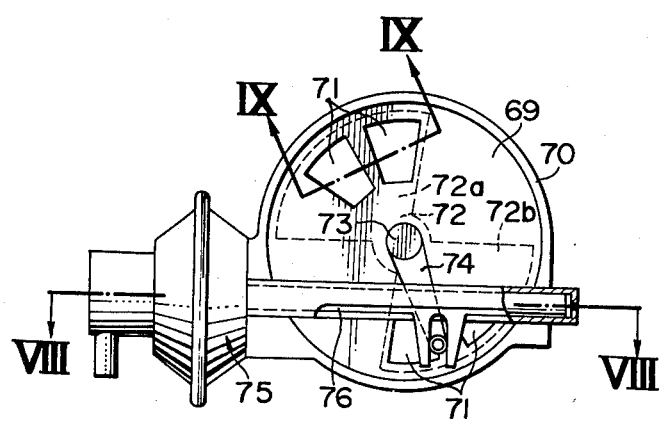
FIG. 7 is a plan view of a check valve suitable for use in the system shown in FIG. 6.
Figure 8:
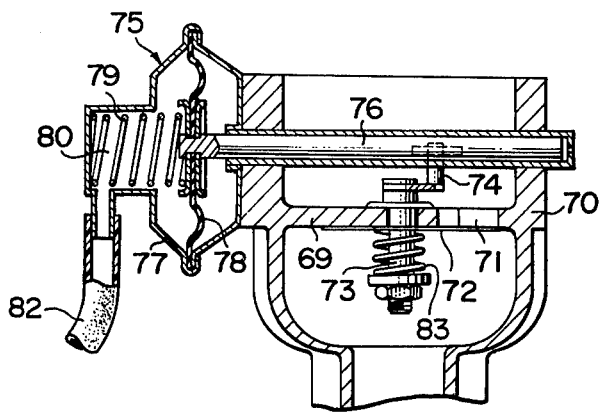
FIG. 8 shows a section along line VIII—VIII in FIG. 7.
Figure 9:
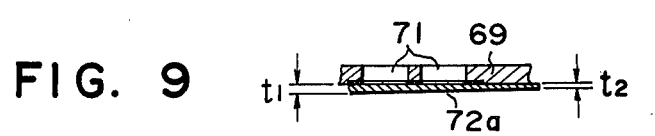
FIG. 9 shows a section along line IX—IX in FIG. 7.

The check valve 67 is a reed valve as better shown in FIGS. 7-9. The valve comprises a casing member 70 which defines a part of the passage 66 and includes a partition 69 dividing the downstream portion communicating to the port 65 from the upstream portion communicating to the air filter. The partition 69 is formed with through openings 71 which, in the shown particular embodiment, are arranged so that four openings are located symmetrically to the center of the partition with each two of them forming a pair. A butterfly type reed member 72 composed of two symmetrical sectoral reed members 72a and 72b is supported by a shaft member 73 positioned at the central portion of the partition 69 and is adapted to be rotated by the shaft member. The sectoral reed members 72a and 72b are adapted to selectively open or close the through openings 71 as they are elastically deformed in accordance with pressure difference applied on opposite sides thereof. The thickness of the sectoral reed member varies in peripheral directions centered at the axis of the shaft 73 as illustrated in FIG. 9. In the shown embodiment, the thickness gradually reduces from $t_1$ to $t_2$ in clockwise direction. A lever 74 is firmly connected to the shaft 73 at one end thereof., the other end of said lever being connected with an actuating rod 76 which is shifted rightward or leftward in FIG. 7 or 8 so that when the rod is shifted leftward in the figure, the reed element 72 is turned clockwise as seen in FIG. 7 around the axis of the shaft member 73. The left end of the actuating rod is connected with a diaphragm 78 of a diaphragm means 75 having a casing 77 which defines a diaphragm chamber 80 on the left side of the diaphragm 78. A compression coil spring 79 biases the diaphragm 78 rightward in the figure. The diaphragm chamber 80 is connected with an intake vacuum sensing port 81 through a conduit 82, said port being opened toward the intake passage 57 at a position downstream of the throttle valve 62. In addition to the biasing force of the compression coil spring 79 which drives the reed valve element 72 counter-clockwise around its rotary center by way of the rod 76 and the lever 74, the reed member 72 is also biased in counter-clockwise direction by a twisting spring 83 mounted around the shaft 73 so that in the rest condition of the device, the reed valve element is rotated to its utmost counter-clockwise rotated position wherein the thinner side of the reed element opposes the through passages 71.

In operation, when the intake air flow rate is relatively high with a result that the intake vacuum applied to the diaphragm chamber 80 is relatively small, the thinner side of the reed valve element 72 opposes the through passages 71. Under this condition, the critical valve opening pressure is relatively low and, therefore, the valve opening duration during which the reed valve elements are biased to release the through openings 71 due to the vacuum caused by pulsating flow in the exhaust passage 64 is relatively long, resulting in a relatively large amount of secondary air introduced into the exhaust passage from the port 65. By contrast, when the throttle valve 62 is relatively closed to reduce engine intake air thereby causing a relatively large intake vacuum in the intake passage 57, the diaphragm 78 is biased leftward in FIG. 7 or 8 against the compression coil spring 79 due to the increased vacuum applied to the diaphragm chamber 80. Consequently, the reed valve element 72 is rotated clockwise by the shaft 73 by way of the rod 76 and the lever 74 so that a thicker side of the reed element opposes the through openings 71. Under this operating condition, the critical valve opening pressure for the reed element 72 is made higher and the valve opening duration caused by the vacuum phases in the exhaust gas pulsation is correspondingly reduced, resulting in a smaller amount of secondary air introduced into the exhaust passage 64.

The secondary air supply depending upon the pulsation of exhaust gas flow corresponds to the case where the air pump delivery pressure $P_A$ is zero or atmospheric pressure.

Although the above explained embodiments have employed the intake vacuum as the signal representing the intake air flow rate of the engine, the present system is also capable to operate by employing other various pressure signals such as Venturi vacuum, delivery pressure of the secondary air supply pump, etc., which are related with the engine operation, as the control signal for modifying supply of secondary air in accordance with intake air or exhaust gas flow rate.

Figure 10:
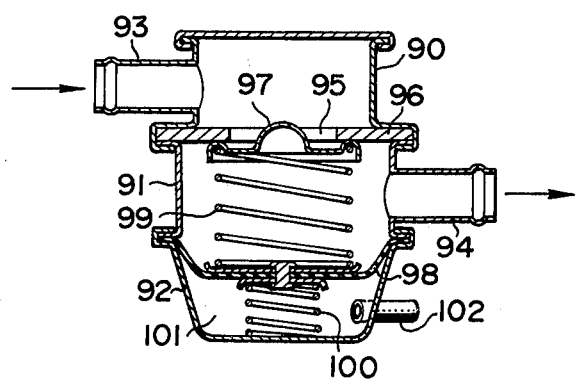
FIG. 10 is a sectional view of another check valve suitable for use in the system of the present invention.

Since the Venturi vacuum in the carburetor increases when the intake air flow rate of the engine increases by contrast to the intake vacuum, if the Venturi vacuum is employed as the control signal, the check valve will have to be constructed as shown in FIG. 10. This check valve comprises an assembly of an upper casing member 90, an intermediate casing member 91 and a lower casing member 92, wherein the upper casing member has a secondary air inlet 93 while the intermediate casing member has a secondary air outlet 94. A separate plate 96 formed with a through opening 95 is provided between the upper and intermediate casing members. The through opening 95 is adapted to be selectively opened or closed by a valve member 97 provided within the intermediate casing member 91. The valve member 97 is biased upward or toward the valve closing position by a compression coil spring 99 mounted between the valve member and a diaphragm 98 mounted and extended between the intermediate casing member 91 and the lower casing member 92. Another compression coil spring 100 is mounted between the diaphragm 98 and the lower casing member 92 to bias the diaphragm upward in the figure. A diaphragm chamber 101 defined by the lower casing member and the diaphragm is applied with Venturi vacuum through a conduit 102.

In operation, when the intake air flow rate of the engine increases, the Venturi vacuum applied to the diaphragm chamber also increases, thereby biasing the diaphragm 98 downward in the figure, thus resulting in a larger mounting length for the compression coil spring 99 so that the preloading of the spring is reduced. Consequently, the critical valve opening pressure for the valve member 97 is lowered.

Thus, by employing a check valve of the structure as shown in FIG. 10, the quantity of secondary air supplied into the exhaust system can be maintained to be proportional to the quantity of engine intake air depending upon the Venturi vacuum of the carburetor as a control signal.

Although the invention has been shown and described with respect to some preferred embodiments thereof, it should be understood by those skilled in the art that various changes and omissions in the form and detail thereof may be made therein without departing from the spirit and scope of the invention.

I claim:

1. A secondary air supply system for an internal combustion engine comprising a passage means for conducting secondary air to the exhaust system of the engine, and a check valve provided in the midst of said passage means for allowing air to flow only toward said exhaust system, said check valve comprising a valve element which opens the valve when air pressure difference above a predetermined level exists across the valve and a control means which controls said predetermined level in accordance with intake air flow rate of the engine in a manner to lower said level as the intake air flow rate increases.

2. The system of claim 1, wherein said control means comprises a spring means which biases the valve element toward a valve closing position and a means to vary effective force of said spring means in accordance with intake air flow rate of the engine.

3. The system of claim 2, wherein said spring means comprises a first spring which biases said valve element toward the valve closing position and a second spring which biases said valve element toward a valve opening position, said means for varying effective force of spring means comprising a diaphragm means having a diaphragm which defines a diaphragm chamber on a first side thereof and supports one end of said second spring on a second side thereof, said diaphragm chamber being applied with intake vacuum of the engine.

4. The system of claim 2, wherein said spring means comprises a spring which biases said valve element toward a valve closing position and said means for varying effective force of said spring means comprises a diaphragm means having a diaphragm which defines a diaphragm chamber on a first side thereof and supports one end of said spring on a second side thereof, said diaphragm chamber being applied with Venturi vacuum in a carburetor for the engine.

5. The system of claim 1, wherein said valve element is a reed member which is biased toward a valve closing position by its own elasticity, the thickness of said reed element being varied at different portions thereof, said control means comprising a means for shifting said reed element in accordance with intake air flow of the engine so that different portions of said reed element is placed at an effective operating position.

6. The system of claim 5, wherein said reed element is a rotary member having varying thickness along peripheral portions thereof, said rotary member cooperating with a disc member formed with at least one through opening adapted to be opened or closed by said reed element, said means for shifting said reed element comprising a diaphragm actuator which selectively rotates said rotary reed member in accordance with intake air flow rate of the engine.

7. The system of claim 6, wherein said rotary reed element has a butterfly shape including two sectoral portions each cooperating with at least one associated through opening.

8. The system of claim 7, wherein said diaphragm actuator is driven by the intake vacuum of the engine to drive said rotary reed element in a first rotary direction the thickness of said rotary reed element gradually decreasing along periphery thereof in said first rotary direction.

* * * * *